Jan. 10, 1967     O. NECKER     3,297,984

TIRE PRESSURE INDICATING DEVICE

Filed March 31, 1964     7 Sheets-Sheet 1

Inventor:
OTTO NECKER
By
OSTROLENK, FABER, GERB & SOFFEN
ATTORNEYS

Jan. 10, 1967 O. NECKER 3,297,984
TIRE PRESSURE INDICATING DEVICE
Filed March 31, 1964 7 Sheets-Sheet 2

Inventor:
OTTO NECKER
By
OSTROLENK, FABER, GERB & SOFFEN
ATTORNEYS

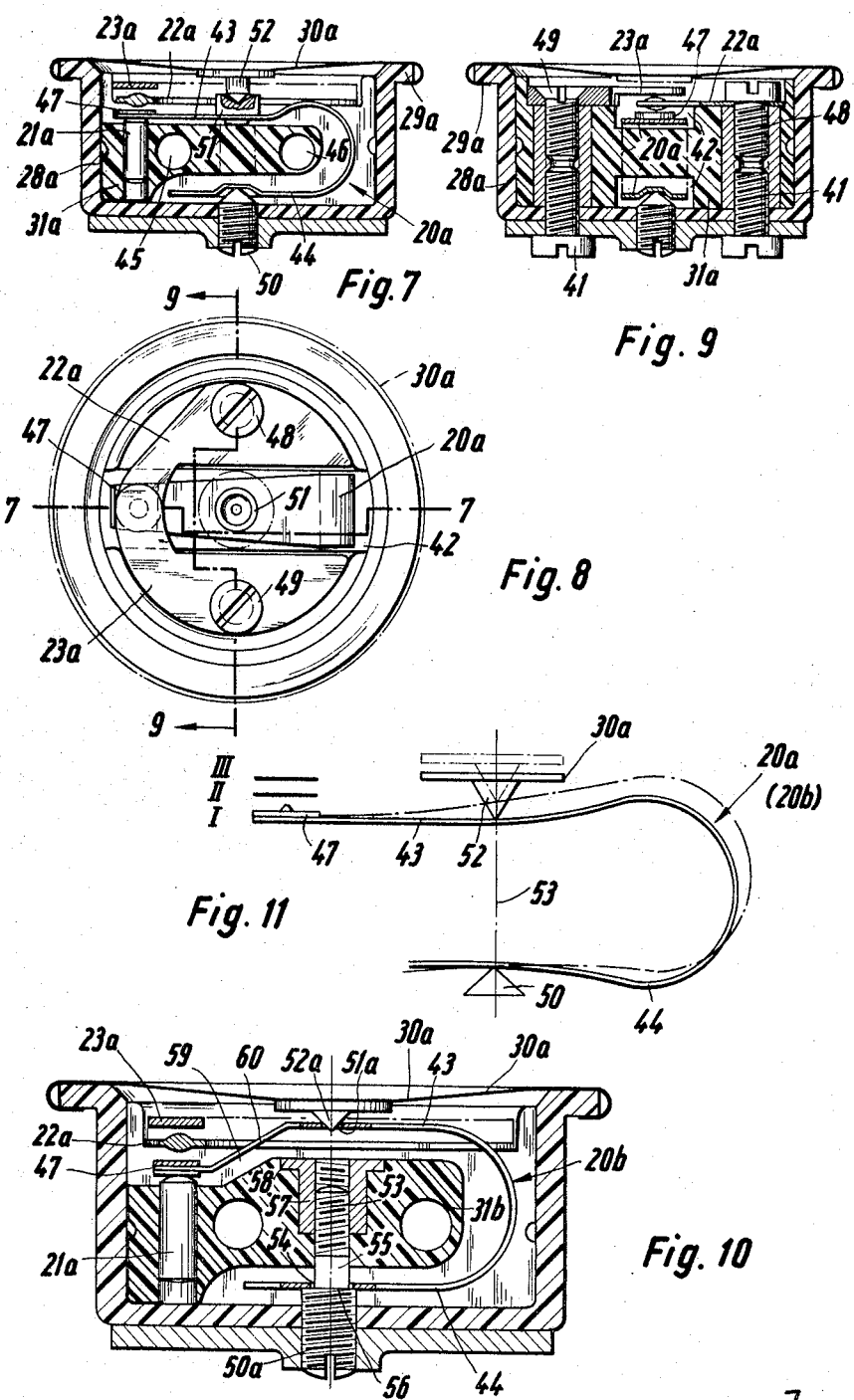

Inventor:
OTTO NECKER
By
OSTROLENK, FABER, GERB & SOFFEN
ATTORNEYS

Jan. 10, 1967    O. NECKER    3,297,984
TIRE PRESSURE INDICATING DEVICE
Filed March 31, 1964    7 Sheets-Sheet 5
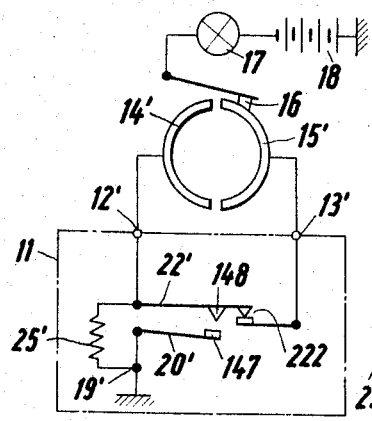
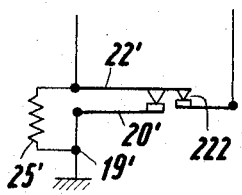
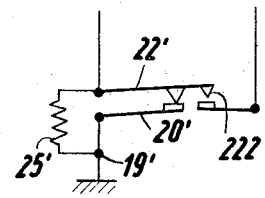
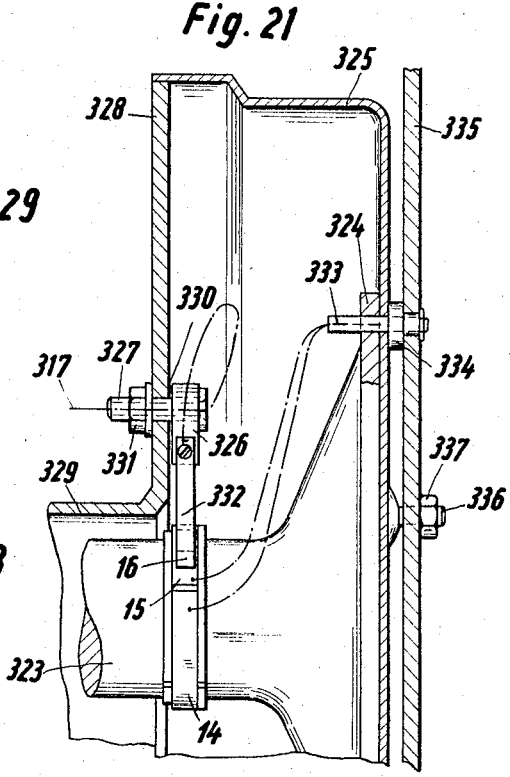
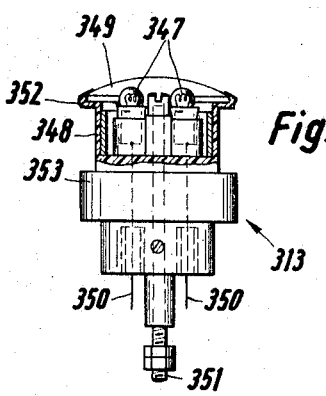
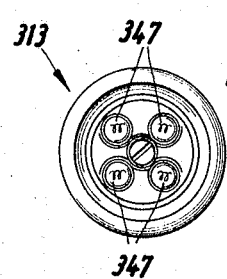
Inventor:
OTTO NECKER
By
OSTROLENK, FABER, GERB & SOFFEN
ATTORNEYS Jan. 10, 1967

O. NECKER 3,297,984

TIRE PRESSURE INDICATING DEVICE

Filed March 31, 1964

Inventor:
OTTO NECKER
By
OSTROLENK, FABER, GERB & SOFFEN
ATTORNEYS

United States Patent Office 3,297,984
Patented Jan. 10, 1967

3,297,984
TIRE PRESSURE INDICATING DEVICE
Otto Necker, Pfaffenweg 47, Stuttgart, Germany
Filed Mar. 31, 1964, Ser. No. 356,265
Claims priority, application Germany, Apr. 9, 1963,
N 23,014/63
11 Claims. (Cl. 340—58)

This invention relates to a device for indicating the tire pressure, more particularly, a device for the constant, automatic supervision of the tire pressure of motor vehicles, which device comprises a switching device, which has a member which is displaceable against spring pressure and directly or indirectly exposed to the internal pressure of the pneumatic tire. Such switching devices are incorporated in the rim of the wheel and cause the operation of electric contacts in dependence on the internal pressure of the pneumatic tire.

It is an object of the invention to provide a pressure-responsive switching device which may be used particularly in conjunction with a multi-stage air pressure supervising system and ensures an accurate indication independently of the speed of the rolling wheel.

According to the invention, the pressure-responsive, electrical switching device is designed so that a leaf spring bears at one end on the displaceable member and at the other end on a fixed abutment and acts on switch contacts of the electrical switching device, the plane of flexure of said spring being radial with respect to the wheel, and the switching position of that portion of said spring which controls the switch contacts being dependent on the position of the displaceable member and independent of the centrifugal force due to the rotation of the wheel.

The leaf spring may consist of a buckling spring, the main axis of which is substantially radial with respect to the rolling wheel. The switching movement of the electrical contacts is substantially at right angles to this buckling spring which causes the movement of the contacts.

In another preferred embodiment of the invention, the leaf spring is substantially U-shaped and one limb of the spring bears on the fixed abutment and the other limb on the displaceable member, and the limb bearing on the displaceable switching member has an extended, free end portion, which is provided with a contact element, which cooperates with the resilient contacts which become operative in succession in the case of a pressure loss. Alternatively, the spring itself may form the co-operaitng contact. In this case the center line of the U-shaped leaf spring is approximately tangential to the wheel and the masses are so calculated that the spring is deformed under the action of the accelerating forces whereas a fixed point is obtained at the end of the free limb bearing on the switching member.

The switch arrangement may be such that a continuous dim light for indicating the operative condition of the system is produced with the aid of series resistors in the first switch position (normal pressure), a flashing light is produced, e.g., by means of a split slip ring arrangement in the second position (small decrease of pressure), and a continuous light of higher intensity is produced in the case of a dangerous pressure loss in the third operative position.

In a preferred embodiment, the switching arrangement is such that a dim light is apparent in the case of normal pressure to indicate the operative condition of the system, a continuous bright light is apparent in the case of a small pressure loss, and the indicating lamp flashes, i.e., that is alternatingly bright and dark, in the case of a high, dangerous pressure loss.

The current is suitably conducted from the rolling wheel to the dashboard by slip ring segments. According to the invention, the slip rings are designed so that they can be radially mounted from the outside on shafts or axles which are not accessible in the axial direction.

The current path from the switching device to the slip ring includes preferably a plug and socket connection, which consists according to the invention of a contact pin having two sections which are insulated from each other, and an associated contact bushing, which has two contact springs, so that two different contacts paths can be connected to the slip ring. The contact pin is also designed as a locating pin, which facilitates the mounting of the wheel disc when the wheel is being replaced.

Further details and advantages of the invention are apparent from the following description if illustrative embodiments of the invention which are shown in the accompanying drawings, in which:

FIG. 1 is a circuit diagram of the tire pressure supervising system,

FIG. 2 shows the contacts of the pressure-responsive switching device in four different switching positions, FIG. 3 is a vertical sectional view showing a pressure-responsive switching device according to the invention, FIG. 4 is an axial elevation showing the switching device shown in FIG. 3 with the top removed, FIGS. 5 and 6 are diagrammatic sketches illustrating the switch positions of the switching device according to the invention, FIG. 7 is a sectional view taken on line 7—7 of FIG. 8 and showing another embodiment of a pressure-responsive switching device according to the invention, comprising a U-shaped leaf spring, FIG. 8 is a top plan view showing the pressure-responsive switching device illustrated in FIG. 7 with the diaphragm removed, FIG. 9 is a sectional view taken on line 9—9 of FIG. 8, FIG. 10 is a vertical sectional view of another embodiment of the switching device according to the invention, FIG. 11 is a diagrammatic showing of the leaf spring of the pressure-responsive switching device shown in FIGS. 7 to 9 or 10, FIG. 12 shows a pressure-responsive switching device comprising different means for adjusting the spring, FIG. 13 is a sectional view taken on line 13—13 of FIG. 12, FIG. 14 is a diagrammatic view showing another embodiment with means for adjusting the coil spring, FIG. 15 is a diagram showing another, preferred circuit arrangement of the system in the case of "normal pressure,"

FIG. 16 shows the switching device of FIG. 15 in the switch position "low pressure loss,"

FIG. 17 shows the switching device of FIG. 15 in the switch position "high pressure loss,"

Figure 19:
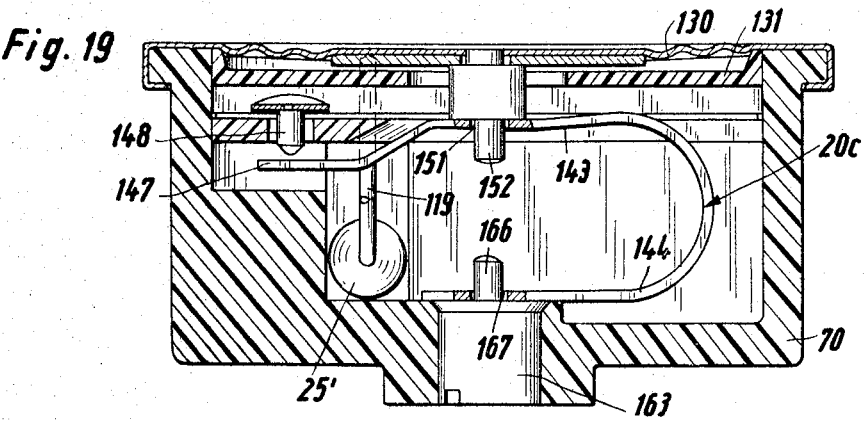
Figure 18:
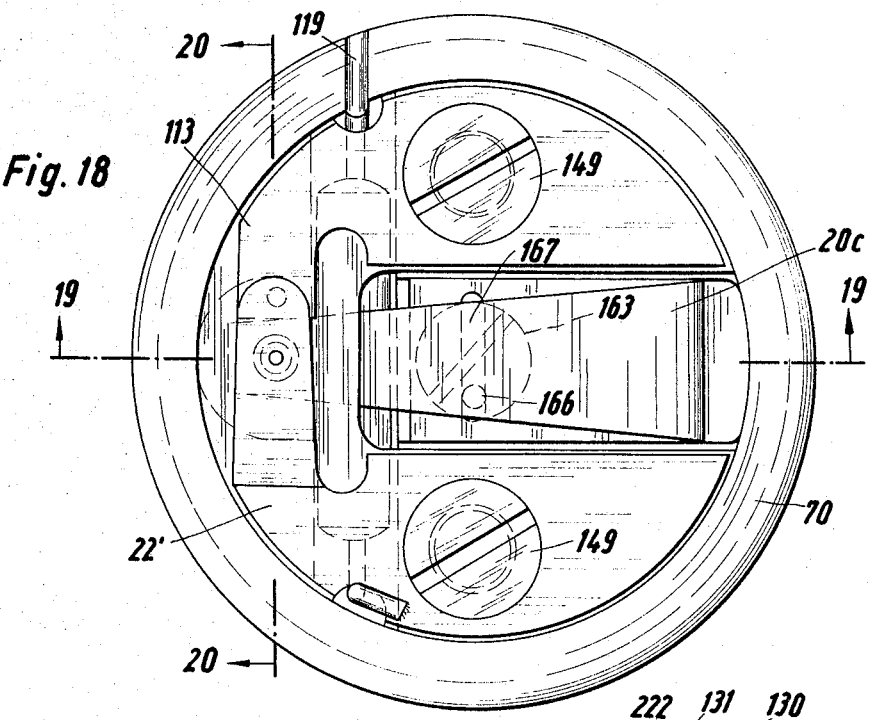
Figure 20:
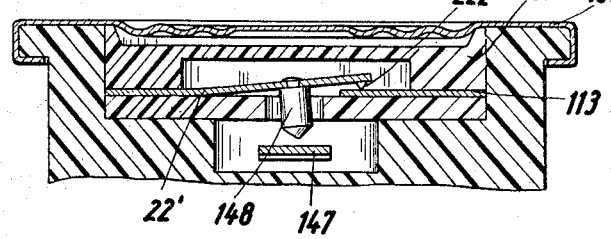
Figure 22:
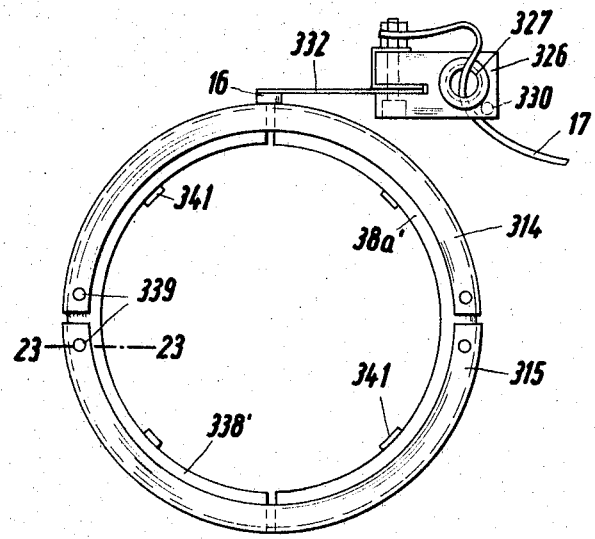
Figure 25:
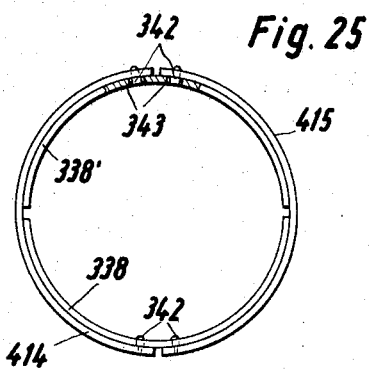
Figure 23:
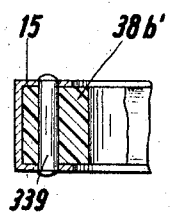
Figure 24:
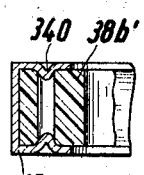
Figure 27:
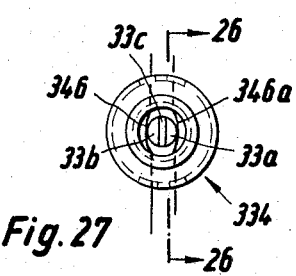
Figure 26:
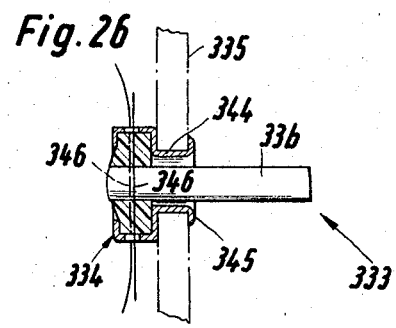

FIG. 18 shows another preferred embodiment of a pressure-responsive switching device, which is applicable particularly in the circuit arrangement of FIG. 15, FIG. 19 is a sectional view taken on line 19—19 of FIG. 18, FIG. 20 is a sectional view taken on line 20—20 of FIG. 18, FIG. 21 is an axial sectional view taken through the brake drum of a motor vehicle with the current-conducting elements provided on or in the drum, FIG. 22 is an axial elevation showing a slip ring arrangement, FIG. 23 is a sectional view taken on line 23—23 of FIG. 22, FIG. 24 is a sectional view similar to FIG. 23 and showing another embodiment, FIG. 25 is an axial elevation showing another embodiment of the slip ring arrangement, FIG. 26 is an axial sectional view taken on line 26—26 of FIG. 27 and showing as a detail the electrical plug and socket connection, FIG. 27 is an axial elevation showing the plug and socket connection of FIG. 26, FIG. 28 is an elevation of the visual indicating device to be secured to the dashboard, FIG. 29 is a partially sectional view showing the indicating device of FIG. 28.

Figure 1:
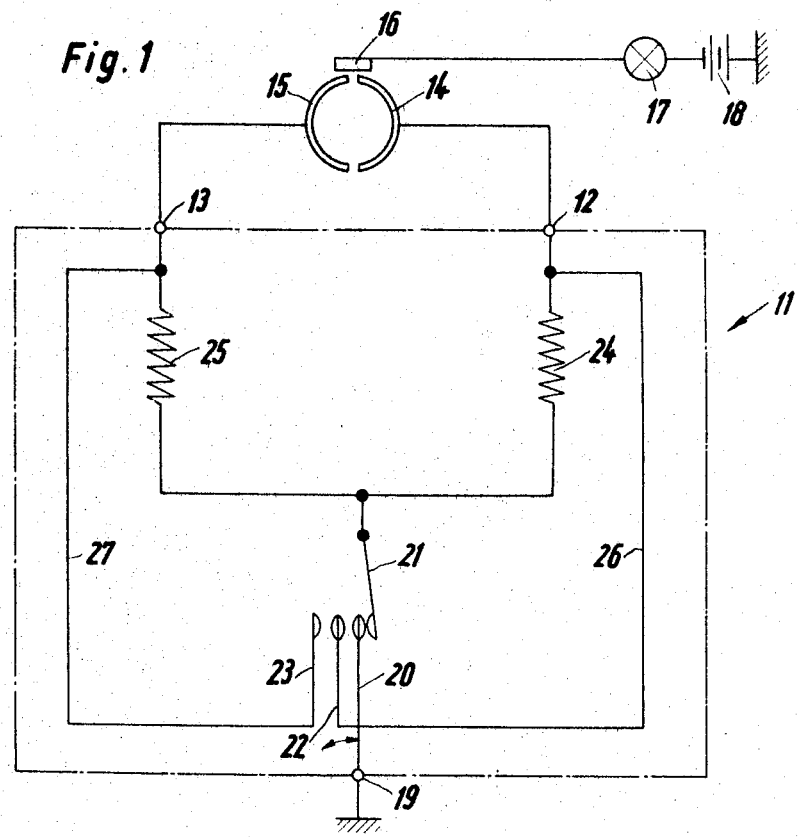

The pressure-indicating switching device included in the supervisory device is illustrated in the circuit diagrams of FIGS. 1 and 15 in the box 11 shown in dash-dot lines. Terminals 12, 13 or 12′, 13′ of the switching device are electrically connected to slip ring segments 14, 15 or 14′, 15′, which revolve with the wheel and, as will be described more in detail hereinafter, cooperate with a brush 16, which is electrically connected by a signal lamp 17 to the battery 18. Another terminal 19 or 19′ of the switching device 11 is connected to ground.

According to FIG. 1, the switching device 11 comprises a contact arm 20, which is movable under the action of the air pressure in the tire in a manner which will be described hereinafter. The contact arm 20 co-operates with contact springs 21, 22, and 23, more particularly with the contact elements of such springs, so that the latter assume the defined switch positions apparent from FIG. 2. The switch position I corresponds to normal pressure (continuous dim light), the switch position II corresponds to a small pressure loss (flashing light) and the position III corresponds to a dangerous pressure loss (continuous light).

The contact spring 21 is connected by a series resistor 24 to the terminal 12 and by a series resistor 25 to the terminal 13. By leads 26 and 27 by-passing the resistors 24 or 25, the contact springs 22 and 23 are connected to the terminals 12 and 13, respectively.

In switch position I (FIG. 2), a current which is reduced by the series resistors 24 and 25 flows through both slip ring segments 14 and 15 so that the lamp 17 emits only a dim light to indicate that the system is operative.

In switch position IIa, the ground contact terminal 19 is directly connected to the terminal 12 by the movable switch arm 20 and the contact spring 22 whereas the terminal 13 is still connected to ground by the series resistor 25 and the contact spring 21. A rotation of the wheel will then result in a flashing light because the entire voltage and the reduced voltage are alternatingly applied to the lamp 17. In switch position IIb, the entire voltage and zero voltage are alternatingly applied to the indicating lamp so that a pronounced flashing is produced.

In the switch position III, both terminals 12, 13 are connected by the contact springs 22, 23 and the switch arm 20 to the ground contact 19 whereas the resistors 24, 25 are short-circuited so that a continuous light is produced by the incandescent bulb 17, to which the entire voltage is continuously applied.

In a simplified embodiment, that end of the series resistors 24, 25 which is connected to 21 in FIG. 1 may be permanently connected to ground 19. As a result, switch position IIb will not be obtained and the full voltage and the voltage reduced by the voltage drop at the series resistors will be alternatively applied to the indicating lamp during periods corresponding each to 180° of the slip ring.

Figure 2:
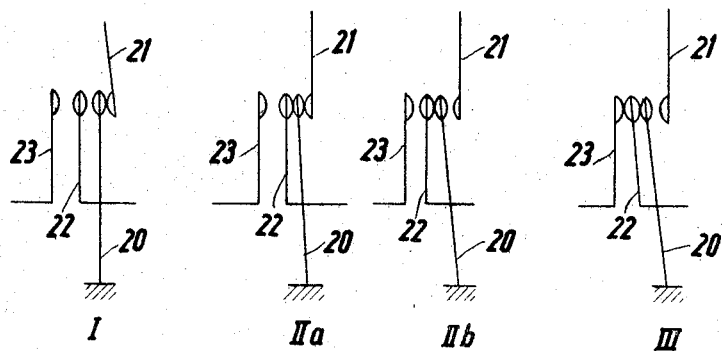
Figure 3:
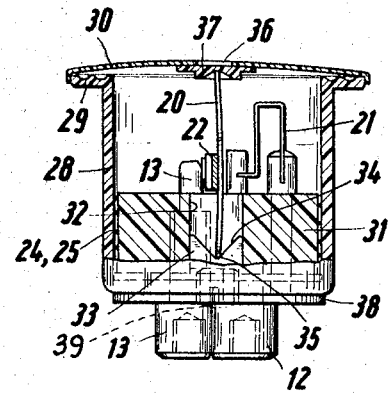
Figure 4:
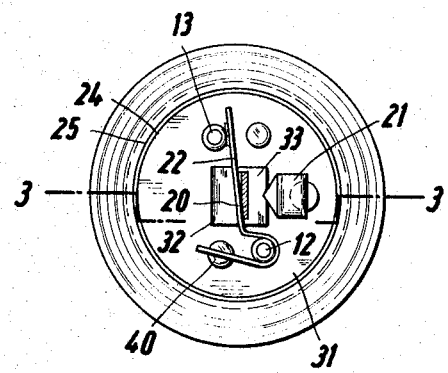

FIGS. 3 to 6 illustrate an embodiment of the pressure-responsive switching device which is diagrammatically shown in FIGS. 1 and 2. The generator comprises a cup-shaped housing 28, which has an external flange 29 carrying a diaphragm 30. A block 31 of insulating material is inserted in the housing 28 and has an axially extending, rectangular opening 32, in which a block 33 of metallic material is guided. This block 33 has a prismatic opening 34 containing an internal knife edge 35, which supports the lower end of a leaf spring 20 acting as a contact lever. At its upper end, the contact spring 20 has a pointed tip 36, which engages a hollow-conical bearing 37 secured to the inside of the diaphragm 30.

A tapped central bore of the bottom part 38 of the housing 28 is in threaded engagement with an adjusting screw 39, which extends into the guide of the block 33 and supports the block 33 from below against the action of the buckling spring 20 so that this spring 20 can be adjusted.

The contact spring 22, which is connected to the terminal 12, extends radially in the housing 28 and is fixed to an insulated pin 40.

Figure 5:
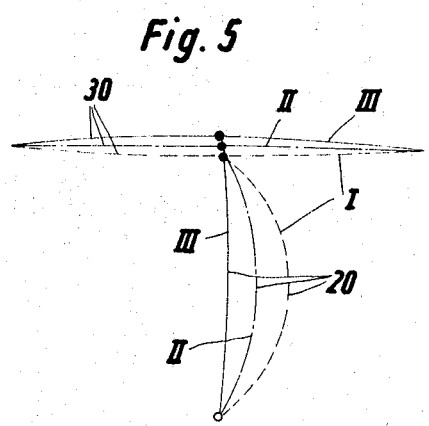
Figure 6:
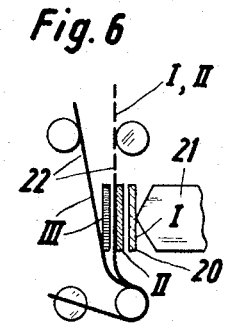

As is particularly apparent from FIGS. 5 and 6, relatively large switching movements can be produced by relatively small changes of the deflection of the diaphragm 30.

FIGS. 7 to 9 show another embodiment of the pressure-responsive signal generator which is apparent from the circuit shown in FIG. 1. This embodiment differs from the pressure-responsive switching device of FIGS. 3 to 6 essentially in that the buckling spring 20 is replaced by a substantially U-shaped leaf spring 20a. Components which are analogous to those of FIGS. 3 to 6 are provided with corresponding reference characters in the embodiment of FIGS. 7 to 9, with a distinguishing suffix a.

The block 31a of insulating material is fixed in the housing 28a by fixing screws 41. The block 31a of insulating material has recesses 42, in which the upper and lower limbs 43 and 44 of the U-shaped leaf spring 20a are freely movable. The block 31a of insulating material comprises also bores 45 and 46, in which rod-like resistors 24 and 25 are inserted.

The control contact 21 is formed by a contact pin 21a inserted in the block 31a of insulating material. The contact pin 21a may consist of a permanent magnet, which holds the upper limb 43 of the leaf spring 20a and damps any natural vibration of the spring in the switch position I. The pin 21a may be axially displaceably mounted and may be under the action of a spring (not shown in the drawing) so that the change from switch position I to switch position IIa and then IIb may be effected.

The free end of the upper limb 43 of the spring 20a overlies this contact pin 21a and carries a contact element 47, which cooperates with the contact springs 22a and 23a, which are spaced above the element 47. The contact spring 22a is fixed by a screw 48 and the contact spring 23a by a screw 49 in the block 31a of insulating material.

The lower limb 44 of the leaf spring 20a bears on an adjusting screw 50 in a tapered bearing. The upper limb 43 of the leaf spring 20a carries also a tapered bearing 51, which is engaged by a pointed tip 52 secured to the diaphragm 30a.

The leaf spring 20a is so designed and arranged that the position of the contact element 47 or of the free end of the upper limb 43 of the leaf spring 20a is determined only by the internal pressure in the tire, i.e., the position of the diaphragm 30a, but is not changed by the accelerating forces which are effective during travel.

The embodiment shown in FIG. 10 differs from that of FIGS. 7 to 9 only in the arrangement of the U-shaped spring. This spring 20b has in its lower portion 44 a hole 54, through which the shank 55 of the adjusting screw 50a extends. The spring is supported by a shoulder 56. The screw-threaded shank 55 is in threaded engagement with a tapped bushing 57, which is anchored together with its top flange 58 in the block 31b of plastics material. The initial stress of the spring 20a may be varied by a rotation of the screw 50a.

The upper limb 43 of the spring 20b has a hole 51a, which is centered on the axis 53 of the screw 50a and in which a ball-shaped tip 52a connected to the diaphragm 30a is supported.

To reduce the overall height, the switch contacts 23a, 22a are disposed adjacent to a recess 59 of the block 31b and the spring portion 43 has an angled part 60.

FIG. 11 is a diagrammatic view illustrating two different spring positions obtained with one and the same tire pressure but different speeds of the wheel. When the spring 20a, 20b is in the position shown in solid lines, the wheel is at rest. The position shown in dash-dot lines is obtained when the wheel is rotating at high speed so that the spring is subjected to centrifugal forces. According to the invention, the arrangement is such that the part of the spring which is on the right of the center line 53 in FIG. 11 is sufficiently deflected to compensate the deflection of the upper limb 43 on the left of the axis 53 and the upward deflection of the diaphragm 30a under centrifugal force. The tip 50 and the contact element 47 remain at rest.

Figure 13:
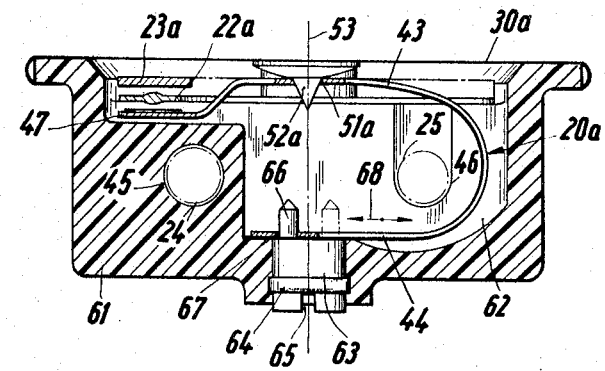
Figure 12:
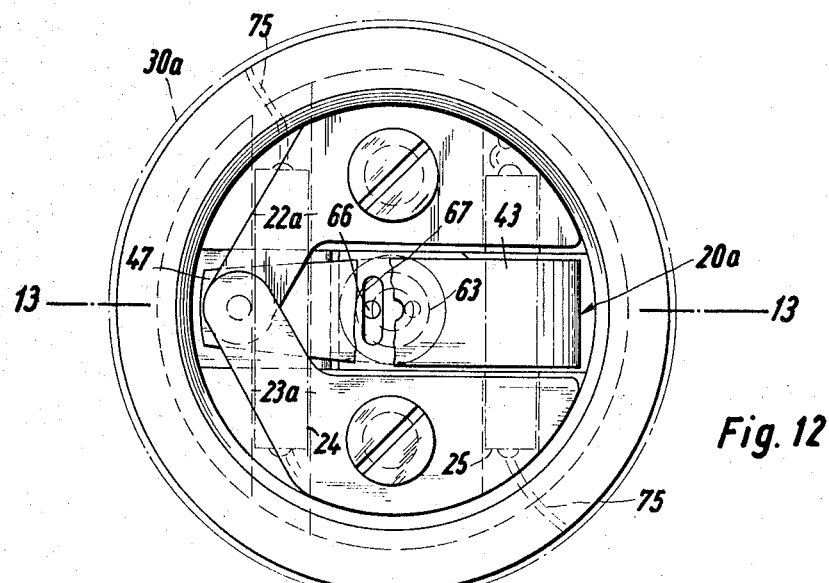

FIGS. 12 and 13 show another embodiment of the pressure-responsive switching device according to the invention. In this embodiment, the leaf spring 20a is adjusted by a lateral displacement of the points of support at right angles to the axis of the housing rather than by a change of the initial stress as in FIGS. 7 to 10. In this embodiment the housing 61 consists of plastics material. The leaf spring 20a is freely movably mounted in a suitable recess 62. The lower section 44 of the spring is supported on the bottom of the housing. A central pin 63 is rotatably mounted in the housing 61 and is held by a peripheral collar 64 against axial displacement. This pin 63 has at its end protruding from the housing a slot 65 for the application of a screwdriver and carries at its end facing the interior of the housing a stud 66, which is eccentric to the axis of rotation of the pin 63 and engages a slot 67 of the lower portion 44 of the spring so that the spring portion 44 can be moved in opposite directions indicated by the arrow 68 by the eccentric stud 66 in response to a rotation of the pin 63.

Figure 14:
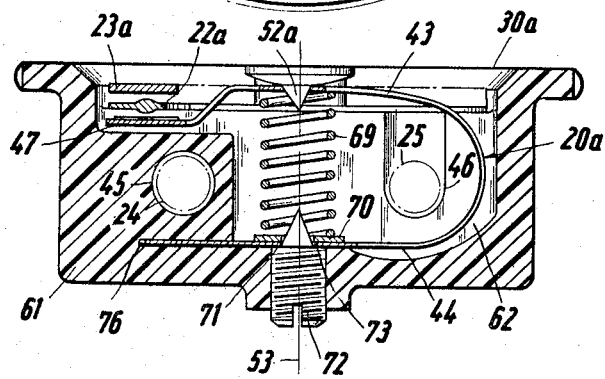

In another embodiment, which is shown in FIG. 14, the leaf spring 20a is adjusted with the aid of a helical compression spring 69, which is centered on the axis 53 of the housing and lies between the two spring portions 43 and 44 of the U-shaped leaf spring 20a. The upper end of the spring 69 bears directly on the spring portion 43a and the lower end of the helical spring 69 rests on an annular disc 70, which is supported by a shoulder 71 of an adjusting screw 72, which extends freely through a hole 73 in the lower spring portion 44. The screw 72 is guided in a tapped bore 74 of the housing 61 and is axially movable to vary the initial stress of the spring 69. The lower end of the leaf spring is inserted in a slot 76 of the housing.

The embodiment described last is particularly suitable for trucks or lorries and busses, i.e., for pneumatic tires under a high internal pressure.

The combination of a leaf spring and a helical spring enables a high spring force to be accommodated in a very small space in the housing of the pressure-responsive switching device. The spring 69 serves for adjusting and in operation assists the U-shaped leaf spring 20a.

The circuit shown in FIGS. 15 to 17 differs from the circuit shown in FIGS. 1 and 2 essentially in that only a single series resistor 25' is connected between the terminals 19' and 12' so that an indication (continuous bright light) is reliably produced in the case of a pressure slightly below normal even when the wheel is not rotating and independently of the position of the brush 16 on the slip ring segments 14' and 15'. A contact spring 22' disposed between the terminals 12' and 13' is controlled by the pressure-responsive contact spring 20', which is connected to the ground terminal 19'.

In the switch position shown in FIG. 15, the current flows from the battery 18 through the indicating lamp 17, the brush 16, the slip ring segment 15', the terminal 13', the contact spring 22' and the resistor 25' to ground 19'. If in this normal position the brush 16 is incidentally on the slip ring segment 14', this will not change the indicating function because the current flows also through the series resistor 25'.

In the case of a pressure drop, the contact lever or the contact spring 20' engages the contacts of the spring 22' so that the resistor 25' is short-circuited and the same signal is produced in any brush position. This signal is the continuous bright light indicating a slight pressure drop. In response to a further pressure drop, the contact spring 20' lifts the contact spring 22' further so that the contacts 222 are opened. In this case, no voltage will be applied to the signal lamp 17 when the brush 16 contacts the contact 15', and the full voltage will be applied to the signal lamp 17 when the brush 16 contacts the contact segment 14'. Hence, during a rotation of the wheel, there will be a distinctly apparent flashing light in this contact position, which corresponds to a dangerous pressure loss.

FIGS. 18 to 20 show a pressure-responsive switching device, which is applicable in the circuit arrangement of FIGS. 15 to 17. A U-shaped leaf spring 20c is disposed in a recess of the cup-shaped housing 70. The lower limb 144 of this spring is supported by a pin 163, which is rotatably mounted in the housing 70. As in the embodiment of FIGS. 12 and 13 the pin 163 has a stud 166, which is eccentric to the axis of rotation of the pin 163 and protrudes into a slot 167 of the spring portion 144. The upper limb 143 of the spring has a hole 151, into which a pin 152 protrudes, which is connected to the diaphragm 130, which covers the housing. The end 147 of the contact spring 20c cooperates with the contact element 148 of a contact spring 22', which is fixed by a screw 149 in hte housing of insulating material. In the switch positions "normal pressure" (FIG. 15) and "small pressure loss" (FIG. 16), this contact spring 22' is connected by the contacts 222 to a contact tag 113. In response to a further pressure drop, the spring end 147 is further raised and with it the contact pin 148 so that the contacts 222 are opened and the switch position shown in FIG. 17 is obtained. The series resistor 25' apparent from FIGS. 15 to 17 is disposed in a recess of the housing. A connecting wire 119 extends through a slot in the edge of the housing and is in contact with the diaphragm 130, which is flanged or otherwise secured to he housing. This diaphragm forms the ground terminal and is connected to the rim of the respective wheel. A ring 131 interposed between the diaphragm 130 and the spring 20c forms a stop for the diaphragm 130 under increased tire pressure or in the case of another overload on the diaphragm. This stop prevents also an elongation of hte spring 20c beyond its elastic limit and insulates the live parts from the diaphragm.

The other end of the resistor 25' is connected to the contact spring 22'.

FIGS. 21 to 29 illustrate the flow of current to the indicating lamp. FIG. 21 shows the conducting means between the switching device and the signal lamp. These means are incorporated in a brake drum of a motor vehicle. The slip ring segments 14, 15 are secured as shown in FIGS. 22 to 25 to the rotating shaft 323, which carries on an external flange 324 the brake drum 325. The slip ring segments 14, 15 are wiped by the brush 16, which is secured to a carrier 326. The latter is fixed by a hollow bolt 327 to the rear end cover 328 of the brake drum. This cover is carried in a fixed position by the hollow axle 329 surrounding the shaft 323. The conducting wire 317 leading to the indicating device extends through the bolt 327. At the end facing the cover 328, this pin carries a pointed tip 330, which fixes the carrier against rotation relative to the cover 328 when the nut 331 is tightened. That end of the pin which is opposite to the pointed tip 330 is supported by the head of the bolt 327. The latter is suitably non-rotatably connected to the carrier 326 so that the spring 332 carrying the brush 16 may be adjusted from the outside.

A contact pin 333 is inserted in the flange 324 or the brake drum 325 and is in contact with a contact bushing 334 when the wheel is mounted. This pin is connected by leads to the contact segments 14, 15.

The bushing 334 is inserted in the wheel disc 335, which carries the wheel and is secured by bolts 336 and nuts 337 on the brake drum 325.

According to FIGS. 22 and 23, the slip ring arrangement consists of two segments 314 and 315, which are U-shaped in cross-section (FIG. 23) and embrace two carrier segments 338 and 338', respectively. The carrier segments, each of which extends substantially around 180°, and the slip ring segments, respectively, are staggered by 90°. A connection between the slip ring segments and the carrier segments is provided by pins 339, which may consist of spring-loaded detent pins, or by inner bosses 340 (FIG. 24), which engage holes formed in the carrier segments and having parallel axes. The carrier segments are supported by resilient buffers 341 on the shaft or axle.

In the embodiment shown in FIG. 25, the slip ring segments 414 and 415 consist of resilient flat material and engage the carrier segments 338 and 338', respectively, under stress. These slip ring segments are provided at the ends with radially inwardly directed extensions 342, which extend into holes 343 of the carrier segments.

FIGS. 26 and 27 show the plug contact connection in detail. The plug pin 333 has two pin sections 33a, which are electrically insulated from each other by an intermediate insulation 33c. Each of these parts is connected to one of the slip ring segments 14 and 15. The contact bushing 334 has a sleeve extension 344, the end 345 of which may be reversely bent for the fixation to the wheel disc. The arrangement is preferably as shown in FIG. 26 so that the contact bushing 334 is on the outside. Two resilient contact tongues 346 extend into the central opening of the bushing 334, contact the pin parts 33a and 33b, respectively, and are connected to the terminals 12, 13 (FIG. 1) or 12', 13' (FIG. 15) of the switching device 11. The contact tongues are suitably embedded in a resilient insulating material, which assists the spring action of the contact tongues and seals the contact space to prevent contamination.

The indicating device 313 shown in FIGS. 28 and 29 comprises four incandescent lamps 347, which are clearly arranged in a common mounting 348 behind a covering disc 349 and are provided each with a terminal 350, which is connected to the associated switching device. A common terminal 351 is adapted to be connected to the source of current 18. The mounting 348 has a flange 352 and a nut 353 so that it can be clamped to the dashboard of the motor vehicle.

To enable an adjustment of the luminous intensity of the indicating lamps in view of the ambient illumination, the current is suitably supplied through a resistor, which may be coupled to the light switch so that the current supply to the signal lamp is reduced when the headlights are turned on, i.e., when it is dark.

Whereas the plane of flexure of the leaf spring must be radial with respect to the road wheel, the function of the device is independent of the angle of this plane of flexure to the axial direction of the road wheel.

What I claim is:

1. A pressure sensing device, comprising a switching device;
   said switching device comprising a pressure sensing structure displaceable to a number of preselected positions in response to variations in the pressure in an object;
   an electrical contact actuating portion connected to said structure;
   a brushing electrical contact;
   an electrical contact element adapted for brushing engagement with said brushing contact; said element being comprised of a first and a second segment; each of said segments being electrically insulated from one another;
   means for moving said element with respect to said brushing contact; said brushing electrical contact being in brushing engagement with said element, whereby movement of said element brings said brushing contact sequentially into engagement with each of said segments;
   a first and a second electrical contact, which are, respectively, electrically connected with said first and second segments;
   said actuating portion having a grounded electrical contact means;
   said grounded contact means being positioned and adapted to electrically engage, selectively, one of said first and second contacts and both of them, depending upon the position of said pressure sensing structure;
   said brushing electrical contact being connectable to an indicator and a power supply.

2. The device of claim 1 wherein,
   an electrical resistor means is provided in electrical series with each segment of said element;
   said resistor means being in electrical parallel with said first and said second contacts, whereby when said grounded contact means electrically engages said first or said second contacts, said resistor means is short-circuited.

3. The device of claim 1 wherein,
   said first contact is electrically engageable with said second contact;
   said grounded electrical contact means comprises a contact structure engageable with said first contact, and a grounded lead connected to said contact structure;
   an electrical resistor connected between said lead and said first contact;
   said contact structure being alternatively positioned in response to changes in the pressure within an object, to engage said first contact while permitting said first contact to electrically engage said second contact, or to engage said first contact while preventing said first contact from engaging said second contact, or to be disengaged from said first contact.

4. The device of claim 1 wherein,
   said pressure sensing structure comprises a pressure sensing member, an abutment, and a leaf spring;
   said leaf spring bearing on said member and on said abutment;
   said leaf spring comprising said actuating portion of said sensing structure and having said grounded electrical contact means thereto affixed.

5. The device of claim 4 also comprising a housing;
   said leaf spring being positioned within said housing;
   said leaf spring being generally U-shaped and having a first and a second limb;
   said grounded electrical contact means being affixed to said first limb;
   said leaf spring having a slot in said second limb;
   a pin rotatably mounted and extending into said housing; a stud eccentrically mounted on said pin and engaging said slot, whereby rotation of said pin repositions said leaf spring.

6. The device of claim 5 further comprising,
   a compression spring means disposed and positioned so as to bias the limbs of said leaf spring apart.

7. The device of claim 4 wherein,
   said pressure sensing member comprises a flexible diaphragm which flexes in response to variations in the pressure, thereby displacing said leaf spring.

8. A wheel assembly comprising, a rim about which is positioned a tire in the pressure in which it is sought to measure, a shaft non-rotatably mounted to said rim, and the device of claim 1;

said pressure sensing structure of said device being mounted to said rim;

said contact element comprising insulatedly separated segments of an electrically conductive ring;

said ring being non-rotatably mounted with respect to said shaft, whereby rotation of said shaft rotates said ring.

9. A wheel assembly comprising, a rim about which is positioned a tire the pressure in which it is sought to measure and a pressure sensing device;

said sensing device comprising a switching device;

said switching device comprising a pressure sensing structure which is itself comprised of a pressure sensing member, an abutment and a leaf spring;

said leaf spring bearing on said pressure sensing member and on said abutment and having a predetermined plane of flexure;

said pressure sensing member being displaceable in said predetermined plane in response to variations in the pressure within a tire, whereby said leaf spring is displaced in said predetermined plane to a number of preselected positions;

said predetermined plane being generally radial with respect to said wheel assembly;

an electrical contact actuating portion connected to said leaf spring;

electrical contacts so positioned that said actuating portion contacts different ones of said contacts as said structure is displaced;

a means for electrically sensing which of said contacts is in contact with said actuating portion;

said sensing means being connectable with an indicator and a power supply;

said pressure sensing structure being mounted to said rim.

10. The device of claim 2, wherein, said contact element comprises insulatedly separated segments of an electrically conductive ring;

said means for moving said element causing said ring to rotate.

11. A wheel assembly comprising, a rim about which is positioned a tire the pressure in which it is sought to measure, a shaft non-rotatably mounted to said rim, and the device of claim 1;

said pressure sensing structure of said device being mounted to said rim.

References Cited by the Examiner

UNITED STATES PATENTS 2,215,153   9/1940   Hull _____ 200—61.26
2,649,518   8/1953   Fuehring _____ 200—61.26

NEIL C. READ, *Primary Examiner.*

A. H. WARING, *Assistant Examiner.*